United States Patent [19]

Morishige et al.

[11] Patent Number: 5,284,899

[45] Date of Patent: Feb. 8, 1994

[54] RESIN PASTE FOR TIGHT SEALING

[75] Inventors: Sueo Morishige; Kenichi Kaneda; Katsushi Terajima, all of Tokyo; Toshiro Takeda, Yokohama; Yushi Sakamoto; Takashi Suzuki, both of Utsunomiya, all of Japan

[73] Assignees: Sumitomo Bakelite Company Limited; NEC Corporation, both of Tokyo, Japan

[21] Appl. No.: 942,489

[22] Filed: Sep. 9, 1992

[30] Foreign Application Priority Data

Sep. 9, 1991 [JP] Japan .................. 03-227561

[51] Int. Cl.$^5$ .................. C08K 3/10; C08G 69/26
[52] U.S. Cl. .................. 524/435; 524/403; 524/413; 524/424; 528/353
[58] Field of Search ............. 528/353; 524/403, 413, 524/424, 435

[56] References Cited

U.S. PATENT DOCUMENTS

| | | | |
|---|---|---|---|
| 4,065,345 | 12/1977 | Progar et al. | 156/309 |
| 4,987,214 | 1/1991 | Kan et al. | 528/317 |
| 4,994,207 | 2/1991 | Edelman et al. | |

FOREIGN PATENT DOCUMENTS

| | | |
|---|---|---|
| 0349310 | 1/1990 | European Pat. Off. |
| 6440586 | 2/1992 | Japan |

OTHER PUBLICATIONS

Hanabusa Kazuto et al, "Conductive Paste Composition," JP-A-22 45 070, Sep. 28, 1990, *Patent Abstracts of Japan*, vol. 014566, Dec. 17, 1990.

Hara Akio et al, "Diamond Paste," JP-A-62-179-570, Aug. 6, 1987, *Patent Abstracts of Japan*, vol. 012028, Jan. 27, 1988.

*Primary Examiner*—John Kight, III
*Assistant Examiner*—T. Mosley
*Attorney, Agent, or Firm*—Browdy and Neimark

[57] ABSTRACT

A resin paste for tight sealing, comprising
(A) at least one filler selected from the group consisting of Ag, Au, Cu, diamond, high-temperature sintered graphite and beryllia,
(B) at least one metal filler selected from the group consisting of Al, Fe and Mg,
(C) a polyimide resin having an imidization degree of 80% or more, obtained by reacting 3,3',4,4'-benzophenonetetracarboxylic acid dianhydride or 3,3',4,4'-oxydiphthalic acid dianhydride with a diamine, and
(D) an organic solvent, wherein the weight proportions of (A), (B) and (C) are $(A)/[(B)+(C)] = 10/90$ to $90/10$ $(B)/[(A)+(C)] = 5/95$ to $90/10$ and the weight proportion of (D) is
$(D)/[(A)+(B)+(C)] = 0.01/100$ to $50/100$.

11 Claims, No Drawings

RESIN PASTE FOR TIGHT SEALING

The present invention relates to a resin paste for tight sealing, which comprises a highly heat-conductive filler, a particular metal filler, a polyimide resin and an organic solvent, which enables adhesion between semiconductor elements (e.g., IC and LSI) and a ceramic package, and which has excellent heat resistance and heat conductivity.

In mounting semiconductor elements in a ceramic package, it has been common to bond the semiconductor elements to the ceramic package by the Au-Si eutectic crystal method and then sealing the package by hermetic sealing using a low-melting glass. However, as the integration of semiconductor elements has become higher and the size of a chip has become larger, the stress generated in the chip during the thermal load has become larger (this leads to reduction in chip reliability) and hence, the bonding agent used is now required to have a stress-relaxing property. Further, as the response of semiconductor elements has become faster, the heat amount generated in the chip has become larger and hence, in order to maintain the chip reliability, it is necessary to dissipate the heat out of the chip as quickly as possible and the heat conductivity of the bonding agent now has a more important role. In recent years, an electrically conductive resin paste obtained by adding an electrically conductive filler (e.g., silver powder) to an epoxy resin, has come to be used, because it is superior to the conventional Au-Si eutectic crystal method in workability, productivity and stress relaxation. However, the use of an epoxy resin system in a ceramic package has the following problems. That is, in ceramic packages, glass sealing at a high temperature of 300° C. or more is conducted and epoxy resins have no sufficient heat resistance at said temperature and a large amount of a decomposition gas is generated during the sealing, which brings about increase in internal stress and blister at the sealed portions.

Meanwhile, it was attempted to produce a resin paste by adding silver powder or the like to a polyimide resin having excellent heat resistance. However, the addition of such metal powder to a polyimide resin has various problems. That is, decomposition of polyimide resin by thermal oxidation is brought about, the heat resistance of said resin is reduced significantly, thermal decomposition of the resin occurs at a glass sealing temperature of 300° C. or more, the gas generated by decomposition makes holes in the sealed portions of a package, even if the sealing of a package is maintained, a large amount of the water generated by decomposition is entrapped in the package and thus, the reliability of semiconductor elements is impaired greatly. In the case of a paste obtained by adding an inorganic filler (e.g., silica powder or alumina powder) to a polyimide resin, there was no reduction in heat resistance, but no sufficient heat conductivity was obtained. Therefore, a resin paste for tight sealing, having excellent heat resistance and heat conductivity has been desired strongly.

The present inventors made extensive research in order to develop a highly heat-conductive resin paste which, when a large chip such as IC or the like has been mounted in a ceramic package with said resin paste and the package has been subjected to hermetic sealing, generates only a small amount of a gas, which gives rise to no reduction in adhesion strength, and which generates a very small amount of water in the package (the water reduces the reliability of the chip). As a result, it was found that a resin paste obtained by dissolving a polyimide resin in a small amount of an organic solvent and adding thereto at least one filler selected from Ag, Au, Cu, diamond, high-temperature-sintered graphite and beryllia and at least one metal filler selected from Al, Fe and Mg, has excellent heat resistance and heat conductivity, generates a small amount of a decomposition gas during a glass sealing step applied to a package in which the resin paste is used, gives small reduction in adhesion strength, and generates a very small amount of water in said package. The finding has led to the completion of the present invention.

The object of the present invention is to solve the above-mentioned problems of the prior art and provide a resin paste for tight sealing, which has excellent heat resistance and heat conductivity and which enables hermetic sealing without impairing the reliability of semiconductor elements.

The present invention resides in a resin paste for tight sealing, comprising (A) at least one filler selected from the group consisting of Ag, Au, Cu, diamond, high-temperature-sintered graphite and beryllia, (B) at least one metal filler selected from the group consisting of Al, Fe and Mg, (C) a polyimide resin having an imidization degree of 80% or more, obtained by reacting 3,3′,4,4′-benzophenonetetracarboxylic acid dianhydride or 3,3′,4,4′-oxydiphthalic acid dianhydride with a diamine, and (D) an organic solvent, wherein the weight proportions of (A), (B) and (C) are $(A)/[(B)+(C)] = 10/90$ to $90/10$ $(B)/[(A)+(C)] = 595$ to $90/10$ and the weight proportion of (D) is $(D)/[(A)+(B)+(C)] = 0.01/100$ to $50/100$.

In the present invention, as the filler (A), there is used at least one member selected from the group consisting of Ag, Au, Cu, diamond, high-temperature-sintered graphite and beryllia. These members are used alone or in combination of two or more. The filler (A) contains ionic impurities such as halogen ions, alkali metal ions and the like in an amount of preferably 10 ppm or less. The filler (A) is used in the particle form of flake, twig, sphere or the like. The particle sizes may be an appropriate mixture of relatively large sizes and small sizes. The particle sizes are desirably 0.01–50 mm in order to obtain required properties.

As the particular metal filler (B), there is used at least one member selected from the group consisting of Al, Fe and Mg. These members are used alone or in combination of two or more. The particular metal filler (B) is used in the particle form of flake, twig, sphere or the like. The particle sizes may be a mixture of different sizes. The particular metal filler (B) contains ionic impurities such as halogen ions, alkali metal ions and the like in an amount of preferably 10 ppm or less.

The resin paste of the present invention may comprise, if necessary, inorganic and/or metal fillers other than the components (A) and (B) to such an extent that the heat conductivity and heat resistance of the resin paste are not impaired.

In the present invention, the filler (A) is necessary for allowing the paste after curing to have sufficient heat conductivity, and the particular metal filler (B) is necessary for suppressing the oxidative decomposition of polyimide at a high temperature of glass sealing and reducing the amounts of gas and water generated by said decomposition. The weight proportions of the filler (A), the filler (B) and the polyimide resin (C) as a binder are (A)/[(B)+(C)]=10/90 to 90/10, preferably 10/90 to 60/40 and (B)/[(A)+(C)]=5/95 to 90/10, preferably 20/80 to 80/20.

When the weight proportion of (A) to [(B) and (C)] is less than 10/90, the resulting resin paste has no sufficient heat conductivity. When the weight proportion is more than 90/10, the resin paste has an extremely high viscosity, which is not preferable in workability. When the weight proportion of (B) to [(A) and (C)] is less than 5/95, (B) is unable to sufficiently suppress the oxidative decomposition of the polyimide resin (C) at a glass sealing step of 300° C. or more. When the weight proportion is more than 90/10, the relative proportion of the filler (A) in the cured paste is small, making it impossible to obtain sufficient heat conductivity and the paste has an extremely high viscosity.

The polyimide resin used in the present invention has an imidization degree of 80% or more and is obtained by reacting 3,3′,4,4′-benzophenonetetracarboxylic acid dianhydride or 3,3′,4,4′-oxydiphthalic acid dianhydride with a diamine.

In the resin paste of the present invention, generally a solvent having a boiling point of 150° C. or more is used in view of the workability of the paste, whereby the solvent evaporation during curing can be controlled by appropriately selecting the curing conditions and the formation of voids can be minimized. When the imidization degree of polyimide resin is less than 80%, however, voids may appear during curing because of the generation of water caused by imidization. Also when the imidization degree is less than 80%, the polyimide may show temporary reduction in molecular weight during curing, which may bring about the viscosity reduction of paste and easy formation of large voids.

Imidization degree can be determined by using (a) an absorption of amide bond before imidization, appearing at 1650 cm$^{-1}$ in FT (Fourier Transfer)-IR spectrum and (b) an absorption of imide ring, appearing at 1780 cm$^{-1}$.

Specific examples of the diamine used in the present invention include 4,6-dimethyl-m-phenylenediamine, 2,5-dimethyl-p-phenylenediamine, 2,4-diaminomesitylene, 4,4′-methylene-di-o-toluidine, 4,4′-methylene-di-2,6-xylidine, 4,4′-methylene-2,6-diethylaniline, 2,4-toluenediamine, m-phenylene-diamine, p-phenylene-diamine, 4,4′-diamino-diphenylpropane, 3,3′-diamino-diphenylpropane, 4,4′-diamino-diphenylethane, 3,3′-diamino-diphenylethane., 4,4′-diaminodiphenylmethane, 3,3′-diamino-diphenylmethane, 4,4′-diamino-diphenyl sulfide, 3,3′-diamino-diphenyl sulfide, 4,4′-diamino-diphenylsulfone, 3,3′-diaminodiphenylsulfone, 4,4′-diamino-diphenyl ether, 3,3′-diamino-diphenyl ether, benzidine, 3,3′-diaminobiphenyl, 3,3′-dimethyl-4,4′-diamino-biphenyl, 3,3′-dimethoxy-benzidine, 4,4″-diamino-p-terphenyl, 3,3″-diamino-p-terphenyl, bis(p-amino-cyclohexyl)methane, bis(p-β-amino-tert-butyl-phenyl) ether, p-bis(2-methyl-4-amino-pentyl)benzene, p-bis(1,1-dimethyl-5-aminopentyl)benzene, 1,5-diamino-naphthalene, 2,6-diaminonaphthalene, 2,4-bis(β-amino-tert-butyl)toluene, 2,4-diamino-toluene, m-xylene-2,5-diamine, p-xylene-2,5-diamine, m-xylene-diamine, p-xylylene-diamine, 2,6-diamino-pyridine, 2,5-diamino-pyridine, 2,5-diamino-1,3,4-oxadiazole, 1,4-diamino-cyclohexane, piperazine, methylene-diamine, ethylene-diamine, propylene-diamine, 2,2-dimethyl-propylene-diamine, tetramethylene-diamine, pentamethylene-diamine, hexamethylene-diamine, 2,5-dimethyl-hexamethylene-diamine, 3-methoxy-hexamethylenediamine, heptamethylene-diamine, 2,5-dimethyl-heptamethylene-diamine, 3-methyl-heptamethylene-diamine, 4,4-dimethyl-heptamethylene-diamine, octamethylenediamine, nonamethylene-diamine, 5-methyl-nonamethylenediamine, 2,5-dimethyl-nonamethylene-diamine, decamethylene-diamine, 1,10-diamino-1,10-dimethyldecane, 2,11-diamino-dodecane, 1,12-diamino-octadecane, 2,12-diamino-octadecane and 2,17-diamino-eicosane. However, the diamine is not restricted to the above.

It is often conducted to introduce a siloxane structure into the polyimide resin component in order to obtain higher adhesion to ceramic package and silicon chip. That is, in production of the polyimide resin component, there may be used a diamine represented by the following formula (1):

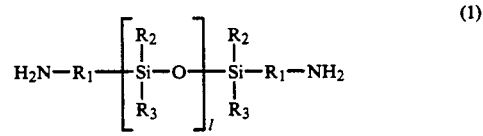

wherein R$_1$ represents a divalent aliphatic group of 1–5 carbon atoms or a divalent aromatic group of 6 or more carbon atoms, R$_2$ and R$_3$, which may be the same or different, independently represent a monovalent aliphatic or aromatic group; and l represents an integer of 1–100.

The organic solvent used in the present invention to dissolve the polyimide resin component, is not particularly restricted. It may be a single solvent or a mixture consisting of two or more solvents as long as it can dissolve the polyimide uniformly. Typical examples of the organic solvent are N,N-dimethylformamide, N,N-dimethylacetamide, N,N-diethylformamide, N,N-diethylacetamide, N,N-dimethylmethoxyacetamide, dimethyl sulfoxide, hexamethylphosphamide, N-methyl-2-pyrrolidone, pyridine, dimethylsulfone, tetramethylsulfone, dimethyltetramethylenesulfone, γ-butyrolactone, diglyme, tetrahydrofuran, methylene chloride, dioxane and cyclohexanone. A poor solvent may be added to the organic solvent, as an evaporation-controlling agent, a leveling agent or the like as long as uniform dissolution of the polyimide is ensured.

The weight proportion of the organic solvent (D) to the filler (A), the particular metal filler (B) and the polyimide resin (C) is preferably (D)/[(A)+(B)+(C)]=0.01/100 to 50/100.

When the weight proportion is less than 0.01/100, the resulting paste has an extremely high viscosity, making workability low. When the weight proportion is more than 50/100, voids are easily formed during curing, resulting in reduced heat conductivity.

The present resin paste may further comprise a defoaming agent if necessary.

The present resin paste for tight sealing can be used for adhesion of semiconductor elements such as IC and the like to a metal frame made of copper, 42 alloy or the like, a ceramic substrate or an organic substrate made of glass-epoxy or the like, and is suitable for adhesion of, in particular, a large chip of 10 mm×10 mm or more. According to this resin paste, formation of voids is very low, excellent glass tight sealing is obtained, the amount of water entrapped in a package is very small, and there can be obtained a sealed package of high heat conductivity, excellent heat dissipation and high reliability.

The resin paste of the present invention can be produced as follows. A filler (A), a particular metal filler (B), a polyimide resin (C) and an organic solvent (D) are independently weighed, and then they are mixed. If necessary, a defoaming agent, etc. may be added. The resulting mixture is sufficiently mixed using a stirrer, a crusher, a mortar, a triple roll, a kneader, etc. alone or in an appropriate combination, to obtain a uniform paste.

In applying the highly heat-conductive resin paste of the present invention, it can be coated on a metal frame or the inside of a ceramic package by using an ordinary dispenser or the like and, after mounting a chip of IC or the like, can be heat-cured in an oven or on a hot plate to bond the chip.

The present invention is hereinafter described specifically by way of Examples.

SYNTHESIS EXAMPLE 1 FOR POLYIMIDE RESIN 32.22 g (0.1 mole) of 3,3',4,4'-benzophenonetetracarboxylic acid dianhydride was dissolved in 240 g of N-methyl-2-pyrrolidone in a four-necked separable flask provided with a thermometer, a stirrer, a raw material inlet and a dry nitrogen gas-introducing tube. Thereto were added 10.63 g (0.06 mole) of 2,6-diamino-4-trifluoromethylpyridine and 4.88 g (0.04 mole) of 2,4-diaminotoluene. The system was stirred for 5 hours at 20° C. to complete the reaction. During the period, dry nitrogen was continuously blown. Subsequently, 72 g of toluene was added thereto. The dry nitrogen gas-introducing tube was removed, and instead a Dean Stark reflux condenser was fitted. The ice bath was removed and the system was heated using an oil bath. The heating was continued to allow imidization to proceed at 140°–150° C. while the water generated by imidization was discharged out of the system by azeotropy with toluene. After 5 hours water generation was over, and the imidization reaction was stopped. The resulting polyimide varnish was dropwise added to 30 liters of pure water in 1 hour with stirring, to precipitate a resin. Filtration was conducted to recover a solid content. The solid was dried in a drier at 120° C. for 3 hours to obtain a polyimide resin. The polyimide resin was measured for FT-IR spectrum to determine its imidization degree from (a) an absorption of amide bond before imidization, appearing at 1650 cm$^{-1}$ and (b) an absorption of imide ring, appearing at 1780 cm$^{-1}$. As a result, the imidization degree was 100%.

SYNTHESIS EXAMPLE 2 FOR POLYIMIDE RESIN

A polyimide resin having an imidization degree of 80% was obtained in the same procedure as in Synthesis Example 1 except that 31.02 g (0.1 mole) of 3,3',4,4'-oxydiphthalic acid dianhydride was used in place of 3,3',4,4'-benzophenonetetracarboxylic acid dianhydride and that 12.20 g (0.10 mole) of 2,4-diaminotoluene was used in place of 2,6-diamino-4-trifluoromethylpyridine and 2,4-diaminotoluene.

SYNTHESIS EXAMPLE 3 FOR POLYIMIDE RESIN

A polyamic acid was synthesized in the same procedure as in Synthesis Example 2 except that the diamine of Synthesis Example 2 was replaced by 11.59 g (0.095 mole) of 2,4-diaminotoluene and 1.24 g (0.005 mole) of 1,3-bis(γ-aminopropyl)-1,1,3,3-tetramethyldisiloxane. Then, imidization reaction was carried out in 3 hours to obtain a polyimide resin. The polyimide resin had an imidization degree of 90%.

SYNTHESIS EXAMPLE 4 FOR POLYIMIDE RESIN

A polyamic acid was synthesized in the same procedure and composition as in Synthesis Example 1. Then, imidization reaction was carried out in 30 minutes to obtain a polyimide resin. The polyimide resin had an imidization degree of 35%.

SYNTHESIS EXAMPLE 5 FOR POLYIMIDE RESIN

A polyamic acid having an imidization degree of 0% was synthesized in the same procedure and composition as in Synthesis Example 1.

EXAMPLE 1

100 parts by weight of the polyimide resin obtained in Synthesis Example 1, 150 parts by weight of silver powder having an average particle diameter of 5 μm, 250 parts by weight of aluminum powder having an average particle diameter of 2 μm, 100 parts by weight of N-methyl-2-pyrrolidone and 20 parts by weight of tetraethyelene glycol dimethyl ether were subjected to stirring to obtain a uniform dispersion. The dispersion was kneaded using a triple roll to obtain a uniform resin paste for mounting. The paste was coated on a ceramic package, and a silicon chip of 10 mm×7 mm was mounted thereon. The assembly was cured for 1 hour at 150° C. and then for 1 hour at 280° C., after which heat treatment of 420° C. for 30 minutes was applied. The adhesion strengths just after the curing and after the heat treatment were measured using a tensile testing machine and they were each more than 20 kgf (measurement limit). The water amount in the package was measured using a mass spectrometer, and it was 1,000 ppm. The glass-sealed portions showed no blister and had no hole. Also, the void area inside the cured paste was examined using a soft X-ray image analyzer, and it was less than 5% based on the total area.

Further, the heat resistance of the cured paste per se was measured using a differential thermobalance. As a result, the initial temperature of thermal decomposition was 480° C., and the heat conductivity was 41 W/m.K.

EXAMPLE 2

A resin paste for mounting was obtained in the same procedure as in Example 1 except that the aluminum powder was replaced by 150 parts by weight of iron powder having an average particle diameter of 3 μm and the amount of silver powder was changed to 250 parts by weight. Adhesion strength measurement was conducted in the same manner as in Example 1 and the strengths before and after the heat treatment at 420° C. for 30 minutes were each more than 20 kgf. The void area inside the cured paste was about 10%, the water amount in the package was 1,200 ppm, and the glass-sealed portions showed no blister and had no hole.

Further, the heat resistance of the cured paste per se was measured using a differential thermobalance. As a result, the initial temperature of thermal decomposition was 460° C., and the heat conductivity was 53 W/m.K.

EXAMPLES 3-4 AND COMPARATIVE EXAMPLES 1-6

Resin pastes for mounting, having properties as shown in Table 1, were obtained in the same procedure as in Example 1 except that there were used paste compositions as shown in Table 1.

excellent heat resistance and heat conductivity and was highly reliable.

In contrast, when the amount of the particular metal filler (B) was small as in Comparative Examples 1 and 3, the decomposition of polyimide by thermal oxidation was not sufficiently suppressed, the water generated thereby was entrapped in the package, and the gas generated by the decomposition gave rise to blister at the glass-sealed portions, reducing the sealing tightness of the package. When the proportion of the filler (A) was small as in Comparative Example 2, no sufficient heat conductivity was obtained. When the proportions of the polyimide resin and the particular metal filler (B) were small as in Comparative Example 4, the resin paste had a very low adhesion strength. When the imidization degree of the polyimide resin was low as in Compara-

TABLE 1

| | Composition of paste | | | |
|---|---|---|---|---|
| | Filler (A) (Parts by weight) | Metal filler (B) (parts by weight) | Polyimide resin (parts by weight) | Organic solvent (parts by weight) |
| Example 3 | Copper powder of average particle diameter of 5 $\mu$m (200) | Magnesium of average particle diameter of 2 $\mu$m (100) | Synthesis Example 2 (80) | NMP*[1] (80) Tetraglyme*[2] (80) |
| Example 4 | Silver powder of average particle diameter of 3 $\mu$m (50) | Aluminum of average particle diameter of 3 $\mu$m (300) | Synthesis Example 1 (40) Synthesis Example 3 (40) | NMP (200) |
| Comparative Example 1 | Silver powder of average particle diameter of 3 $\mu$m (500) | Aluminum of average particle diameter of 2 $\mu$m (10) | Synthesis Example 1 (100) | NMP (100) Tetraglyme (100) |
| Comparative Example 2 | Silver powder of average particle diameter of 3 $\mu$m (10) | Iron of average particle diameter of 2 $\mu$m (400) | Synthesis Example 2 (100) | NMP (200) |
| Comparative Example 3 | Copper powder of average particle diameter of 5 $\mu$m (500) | — | Synthesis Example 1 (300) | NMP (500) Diglyme*[3] (200) |
| Comparative Example 4 | Silver powder of average particle diameter of 3 $\mu$m (200) | Aluminum of average particle diameter of 2 $\mu$m (10) | Synthesis Example 3 (10) | NMP (200) |
| Comparative Example 5 | Silver powder of average particle diameter of 5 $\mu$m (150) | Aluminum of average particle diameter of 2 $\mu$m (250) | Synthesis Example 4 (100) | NMP (100) Tetraglyme (100) |
| Comparative Example 6 | Silver powder of average particle diameter of 5 $\mu$m (150) | Aluminum of average particle diameter of 2 $\mu$m (250) | Synthesis Example 5 (100) | NMP (100) Tetraglyme (100) |

| | Adhesion strength (Kgf) | | Void area (%) | Heat conductivity (W/m·K) | Amount of water in package (ppm) | Tightness of glass sealing | Initial temperature of thermal decomposition (°C.) |
|---|---|---|---|---|---|---|---|
| | After curing | After heat treatment of 420° C. for 30 minutes | | | | | |
| Example 3 | >20 | >20 | 10 | 30 | 1000 | Good | 450 |
| Example 4 | >20 | >20 | 10 | 25 | 700 | Good | 480 |
| Comparative Example 1 | >20 | 15 | 10 | 70 | 8000 | Blister was seen. | 370 |
| Comparative Example 2 | >20 | >20 | 10 | 7 | 500 | Good | 470 |
| Comparative Example 3 | >20 | 10 | 70 | 10 | 18000 | Blister was seen. | 330 |
| Comparative Example 4 | 5 | <1 | 5 | 100 | 2000 | Good | 460 |
| Comparative Example 5 | >20 | >20 | 80 | 41 | 1500 | Good | 475 |
| Comparative Example 6 | 8 | 5 | 90 | 41 | 2000 | Good | 480 |

*[1]N-methyl-2-Pyrrolidone
*[2]Tetraethylene glycol dimethyl ether
*[3]Diethylene glycol dimethyl ether As seen in Examples 1, 2, 3 and 4 (Examples 3 and 4 are shown in Table 1), when resin pastes for mounting, consisting of a filler (A), a particular metal filler (B), a polyimide resin and an organic solvent, fall within the scope of the present invention, the adhesion strength was more than 20 kgf/(10 mm×7 mm) after curing and also after heat treatment (420° C.×30 minutes), excellent hermetic tight sealing was obtained, the water amount inside the package was less than 5,000 ppm, the void area was 10% or less, and the sealed package had tive Examples 5 and 6, the polyamic acid remained after curing and gave rise to dehydrating ring-closing reaction at the heat treatment for tight sealing, which generated a large amount of water in the package and gave a large void area.

We claim:

1. A resin paste for tight sealing, consisting essentially of (A) at least one filler selected from the group consisting of Ag, Au, Cu, diamond, high-temperature-sintered graphite and beryllia,
(B) at least one metal filler selected from the group consisting of Al, Fe and Mg,
(C) a polyimide resin having an imidization degree of 80% or more, obtained by reacting 3,3′,4,4′-benzophenonetetracarboxylic acid dianhydride or 3,3′,4,4′-oxydiphthalic acid dianhydride with a diamine, and
(D) an organic solvent, wherein the weight proportions of (A), (B) and (C) are $$(A)/[(B)+(C)] = 10/90 \text{ to } 90/10$$

$$(B)/[(A)+(C)] = 5/95 \text{ to } 90/10$$

and the weight proportion of (D) is $$(D)/[(A)+(B)+(C)] = 0.01/100 \text{ to } 50/100.$$

2. A resin paste for tight sealing according to claim 1, wherein the filler (A) contains ionic impurities in an amount of 10 ppm or less.

3. A resin paste for tight sealing according to claim 1, wherein the metal filler (B) contains ionic impurities in an amount of 10 ppm or less.

4. A resin paste for tight sealing according to claim 1, wherein the weight proportions of the components (A), (B) and (C) are $$(A)/[(B)+(C)] = 10/90 \text{ to } 60/40.$$

5. A resin paste for tight sealing according to claim 1, wherein the weight proportions of the components (A), (B) and (C) are $$(B)/[(A)+(C)] = 20/80 \text{ to } 80/20.$$

6. A resin paste for tight sealing according to claim 1, wherein the filler (A) is selected from the group consisting of Ag and Cu.

7. A resin paste for tight sealing according to claim 1, wherein the filler (A) and the filler (B) have a particle size of about 0.01 to 50 μm.

8. A process for preparing a semiconductor comprising,
contacting a silicon chip with the resin paste of claim 1, and
heating at a temperature and for a duration until the resin paste adheres to and hermetically seals at least part of a surface of said silicon chip.

9. A process according to claim 8, wherein said heating comprises a lower temperature curing followed by a heat treatment of at least 300° C.

10. A process according to claim 9 wherein said heat treatment is performed at about 420° C. for about 30 minutes.

11. A process for preparing a resin paste for tight sealing comprising,
mixing 3,3′,4,4′-biphenyltetracarboxylic acid dianhydride or 3,3′,4,4′-oxydiphthalic acid dianhydride with a diamine,
allowing imidization to occur until (C) a polyimide resin having an imidization degree of about 80% or more is formed,
adding (A) at least one filler selected from the group consisting of Ag, Au, Cu, diamond, high-temperature-sintered graphite and beryllia, and (B) at least one filler selected from the group consisting of Al, Fe and Mg, and
mixing in the presence of an organic solvent (D) to form the resin paste. wherein the weight proportions of (A), (B) and (C) are $$(A)/[(B)+(C)] = 10.90 \text{ to } 90/10$$

$$(B)/[(A)+(C)] = 5/95 \text{ to } 90/10$$

and the weight proportion of (D) is $$(D)/[(A)+(B)+(C)] = 0.01/100 \text{ to } 50/100.$$

* * * * *